(12) United States Patent
Timmer

(10) Patent No.: US 6,751,286 B2
(45) Date of Patent: Jun. 15, 2004

(54) COMPUTED-TOMOGRAPHY SYSTEM WITH FILTERING

(75) Inventor: Jan Timmer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 25 days.

(21) Appl. No.: 10/150,053

(22) Filed: May 16, 2002

(65) Prior Publication Data

US 2003/0007592 A1 Jan. 9, 2003

(30) Foreign Application Priority Data

May 16, 2001 (EP) ............................................ 01201842

(51) Int. Cl.⁷ ............................................. G01N 23/04
(52) U.S. Cl. ........................... 378/62; 378/98; 378/98.2
(58) Field of Search ........................... 378/62, 98, 98.2, 378/98.4, 98.5, 98.6, 98.7, 98.8; 382/131, 260, 275, 254

(56) References Cited

U.S. PATENT DOCUMENTS

| | | | |
|---|---|---|---|
| 4,707,786 A | | 11/1987 | Dehner |
| 5,416,815 A | | 5/1995 | Hsieh |
| 5,708,693 A | * | 1/1998 | Aach et al. ................... 378/62 |
| 5,818,900 A | * | 10/1998 | Vogelsong et al. ............ 378/62 |
| 6,141,399 A | * | 10/2000 | Tsujii ........................ 378/98.7 |

FOREIGN PATENT DOCUMENTS

DE   198 53 143 A1   6/1999

* cited by examiner

*Primary Examiner*—David V. Bruce
*Assistant Examiner*—Hoon Song
(74) *Attorney, Agent, or Firm*—Thomas M. Lundin, Esq.

(57) ABSTRACT

A computed-tomography system comprises a data-processing system arranged to receive attenuation profiles for respective orientations. A lowest representative noise level of the individual attenuation profiles is determined. The attenuation profiles are filtered in dependence of said lowest representative noise level. In particular it is achieved that the filtered attenuation profiles have the lowest maximum noise level among the received attenuation profiles.

6 Claims, 1 Drawing Sheet

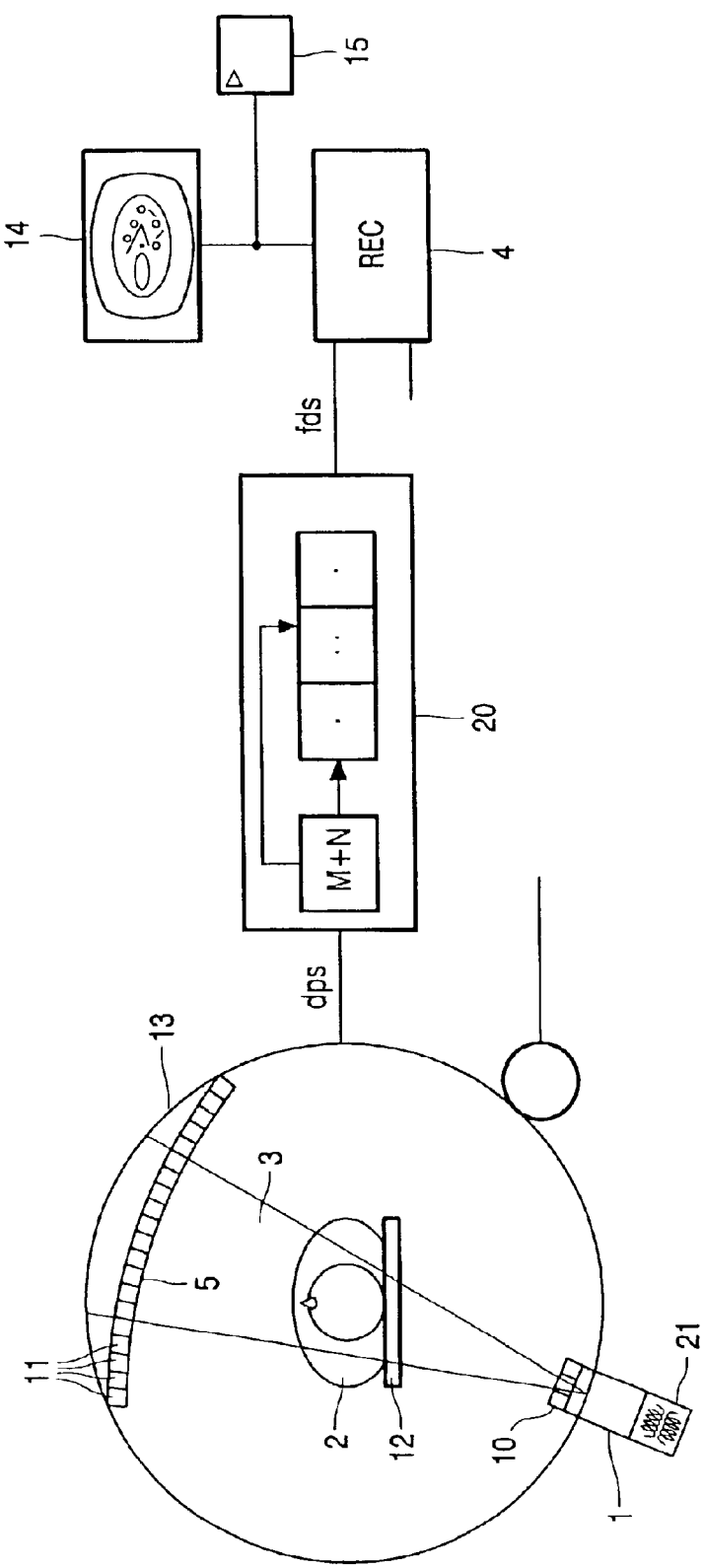

COMPUTED-TOMOGRAPHY SYSTEM WITH FILTERING

BACKGROUND

The invention relates to a computed-tomography system comprising a data-processing system.

In general, a computed-tomography system comprises an x-ray source and an x-ray detector which can be rotated around an object to be examined, notably a patient to be examined. From several orientations the object is irradiated with an x-ray beam from the x-ray source. At these respective orientations the x-ray detector receives x-radiation that has passed through the object and forms a attenuation profile for the orientation at issue. The attenuation profiles represent the attenuation of incident x-rays in the object, notably due to scattering of x-rays and absorption of x-rays along the path of the x-rays through the object at the orientation at issue.

Such a computed-tomography system is known from the U.S. Pat. No. 5,416,815.

The data-processing system of the known computed-tomography system is arranged to reconstruct slice images from projection data which form the attenuation profiles. The attenuation profiles are adaptively filtered in order to avoid streak-like artefacts in the reconstructed slice images. The adaptive filter of the known computed-tomography system is adjusted in dependence of the signal level of the attenuation profile at issue.

SUMMARY

An object of the invention is to provide a computed-tomography system in which the diagnostic quality of the reconstructed slice images is further improved.

This object is achieved by a computed-tomography system according to the invention wherein the data-processing system is arranged to receive attenuation profiles for respective orientations determine a lowest representative noise level of the individual attenuation profiles and filter the attenuation profiles in dependence of said lowest representative noise level.

The data-processor of the computed-tomography system according to the invention reduces propagation of noise in the attenuation profiles into slice images reconstructed from the filtered attenuation profiles. Notably, the contrast resolution of the reconstructed slice images is increased by the filtering. Consequently, the diagnostic quality of the reconstructed slice image is improved in that small details having little contrast are rendered well visible in a display of the reconstructed slice images.

Preferably, the filtered attenuation profiles have substantially equal noise levels. This may for example be achieved in that the filtered attenuation profiles have a noise level that equals the lowest of the representative noise levels in the individual attenuation profiles received by the data-processing system.

More preferably, the maximum noise level in the individual attenuation profile is used as the representative noise level of the individual attenuation profiles. In this way, the filtered attenuation profiles all have the lowest of the maximum noise level occurring in the received attenuation profiles. Then in the reconstruction of the slice images, such as by a filtered back-projection applied to the filtered attenuation profiles the contrast resolution is improved. Although the filtering of the attenuation profiles causes a slight deterioration of the spatial resolution, the contrast resolution is more improved than the amount by which spatial resolution becomes worse.

Advantageously, the representative noise level, such as the maximum noise level of the individual attenuation profiles is derived from the attenuation value of the attenuation profile at issue. Notably, the noise level is mainly determined by the Poisson-like x-ray shot noise. Especially at low x-ray intensities x-ray shot noise dominates the noise in the attenuation profiles. Owing to the Poisson-nature of the noise, the noise level can be determined from the attenuation value of the attenuation profile at issue. This attenuation value is the ratio of the x-ray intensity having passed through the object, such as the patient to be examined, to the incident x-ray intensity. In practice accurate values for the attenuation value are obtained by averaging this ratio of the attenuation profile at issue. It is noted that the attenuation values of respective profiles are compared relative to one another and the absolute attenuation level relative to the actual incident X-ray intensity is not required. For example, the attenuation value of several attenuation profiles at respective positions in the object may be derived from an explorative x-ray image, such as the so-called scanogram, which is formed before the acquisition of the attenuation profiles.

The invention also relates to a computed-tomography method as defined in claim 5. The computed-tomography method according to the invention increases the contrast resolution of the reconstructed slice images by the filtering.

The invention further relates to a computer programme as defined in claim 6. The computer programme according to the invention may be loaded, i.e. install the software, into the working memory of a computed tomography system. Hence, that computed tomography system is enabled to increase the contrast resolution by employing the method as defined in claim 5. It is noted that computed-tomography systems are in general arranged to receive the attenuation profiles so that instructions for receiving the attenuation need in general not be supplied together with the instructions aimed at increase the contrast resolution. However, of course, when complete software is installed also instruction pertaining to the acquisition of the attenuation profiles is involved.

DRAWINGS

These and other aspects of the invention will be elucidated with reference to the embodiments described hereinafter and with reference to the accompanying drawing wherein The FIGURE shows diagrammatically a computer device according to the invention.

DESCRIPTION

The FIGURE shows diagrammatically a computer tomography device according to the invention. An X-ray source 1 co-operates with a slit-shaped diaphragm 10 so as to emit a diverging flat (fan-shaped) X-ray beam 3 for irradiating the object 2, for example a patient to be examined. The X-ray detector 5 is arranged opposite the X-ray source 1. The X-ray detector of the present embodiment is a position-sensitive X-ray detector which comprises a row of separate detector cells 11. The detector cells 11 are, for example gas-filled (xenon) detectors or solid-state detectors. The thickness of the fan-shaped X-ray beam generally amounts to from 1 mm to 10 mm, measured halfway between the X-ray source and the X-ray detector. The intensity of the radiation having traversed the patient and incident on the X-ray detector is determined mainly by the absorption within the patient 2 who is arranged on a table 12 between the X-ray source and the X-ray detector. The attenuation profiles are measured along a large number of lines from a large number of directions by rotating the X-ray source 1 and the X-ray detector 5 together around the patient by means of a support 13. The combined rotation of the X-ray source and the X-ray detector may be continuous but also intermittent. Furthermore, the patient can be displaced along the axis of rotation during irradiation and rotation, so that the X-ray detector acquires data from a significant three-dimensional volume of the patient. In addition to a rotatable assembly with an X-ray source and an X-ray detector, the computer device may also include a detection system which is not rotatable but extends along (substantially) the entire circumference of the patient. Generally speaking, the X-ray source and the X-ray detector are fully rotated together, i.e. through 360°, around the patient. Alternatively, use can be made of a detection system which extends along the entire circumference of the patient; in that case the X-ray source is rotated completely around the patient. Furthermore, an annular anode arranged around the patient can also be used as the X-ray source, the point of incidence of an electron beam generating X-rays from the anode material then being displaced along the annular anode around the patient. It suffices in principle, however, to use a fan-shaped beam which rotates around the patient through an angle which amounts to the sum of 180° and the angle of aperture of the fan-shaped beam.

Further, instead of a fan-beam a cone-beam with a substantially wider divergence may be employed, preferably in combination with a mult-array x-ray detector that is provided with several rows of detector elements. This enables the acquisition of several attenuation profiles in parallel.

The filtered attenuation profiles are applied to a reconstruction unit 4. In the reconstruction unit 4 after correction for known error sources and disturbances, an image of a slice along a plane through the patient to be examined is derived from these filtered attenuation profiles. An image of this kind may represent, for example, a cross-section of the patient to be examined. Such an image can be displayed on a monitor 14 which is coupled to the reconstruction unit. The image may also be stored as a digital image matrix or be applied to an image processing unit 15 for further processing.

A particular filter for the present invention is a spatial filter having a parametric filter kernel (½a, 1-a, ½a), where the weight a is adjustable. In particular the weight a is adjusted on the basis of the difference between the maximum attenuation values in the attenuation profile at issue and the maximum attenuation value that occurs in the attenuation having the lowest maximum attenution and thus the lowest noise.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A computed-tomography system comprising a data-processing system arranged to receive attenuation profiles for a plurality of respective orientations determine a lowest representative noise level of the individual attenuation profiles and filter the attenuation profiles in dependence of said lowest representative noise level.

2. A computed-tomography system as claimed in claim 1, wherein the data-processing system is arranged to filter the attenuation profiles such that a noise level of the filtered attenuation profiles substantially equals said lowest representative noise level.

3. A computed-tomography system as claimed in claim 1, wherein the representative noise level of the individual attenuation profile is the maximum noise level of the individual attenuation profile at issue.

4. A computed-tomography system as claimed in claim 1, wherein the data-processing system is arranged to derive the representative noise level of the individual attenuation profile from the attenuation value of the individual attenuation profile at issue.

5. A computed-tomography method comprising the steps of receiving attenuation profiles for a plurality of respective orientations determining a lowest representative noise level of the individual attenuation profiles and filtering the attenuation profiles in dependence of said lowest representative noise level.

6. A computer usable medium having a computer readable programme comprising instructions for determining a lowest representative noise level of individual attenuation profiles corresponding to a plurality of respective orientations and filtering the attenuation profiles in dependence of said lowest representative noise level.

* * * * *